(12) United States Patent
Matuyama

(10) Patent No.: US 6,642,702 B1
(45) Date of Patent: Nov. 4, 2003

(54) DETECTION CIRCUIT FOR MAXIMUM VALUE OF THREE PHASE SIGNAL AND DETECTION METHOD OF THE SAME

(75) Inventor: Yasuhiko Matuyama, Nagasaki (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/436,220

(22) Filed: Nov. 9, 1999

(30) Foreign Application Priority Data

Nov. 16, 1998 (JP) ............................... P10-324598

(51) Int. Cl.$^7$ .................... H03D 13/00; G01R 19/00
(52) U.S. Cl. ................. 324/76.77; 324/76.11; 324/107
(58) Field of Search ................ 324/76.11, 606, 324/76.77, 103 P, 107, 76.13, 76.15; 702/66, 67

(56) References Cited

U.S. PATENT DOCUMENTS 4,815,002 A * 3/1989 Verbanets .................... 364/484
5,153,821 A * 10/1992 Blasko ........................ 363/41
5,345,409 A * 9/1994 McGrath et al. ............... 702/60

OTHER PUBLICATIONS

"Fundamental of electrical Engineering: Principles and Applications" by Thomas J. Cavicchi, 1993 by Prentice–Hall, Inc. (pp. 280–287).*

* cited by examiner

Primary Examiner—Michael Sherry
Assistant Examiner—Parresh Patel
(74) Attorney, Agent, or Firm—Rader, Fishman & Grauer PLLC; Ronald P. Kananen, Esq.

(57) ABSTRACT

A detection circuit for a maximum amplitude value of a 3-phase signal wherein the three phase-signals having a phase difference of 120° from each other is converted to sampling data of digital values by an A/D converter circuit in every sampling period properly decided, and after that, when the coincidence of the values of any two phase-signals among three phase-signals is detected, the value of the remaining one phase-signal is taken as the maximum amplitude value. Thereby, an accurate maximum amplitude value can be obtained.

9 Claims, 4 Drawing Sheets

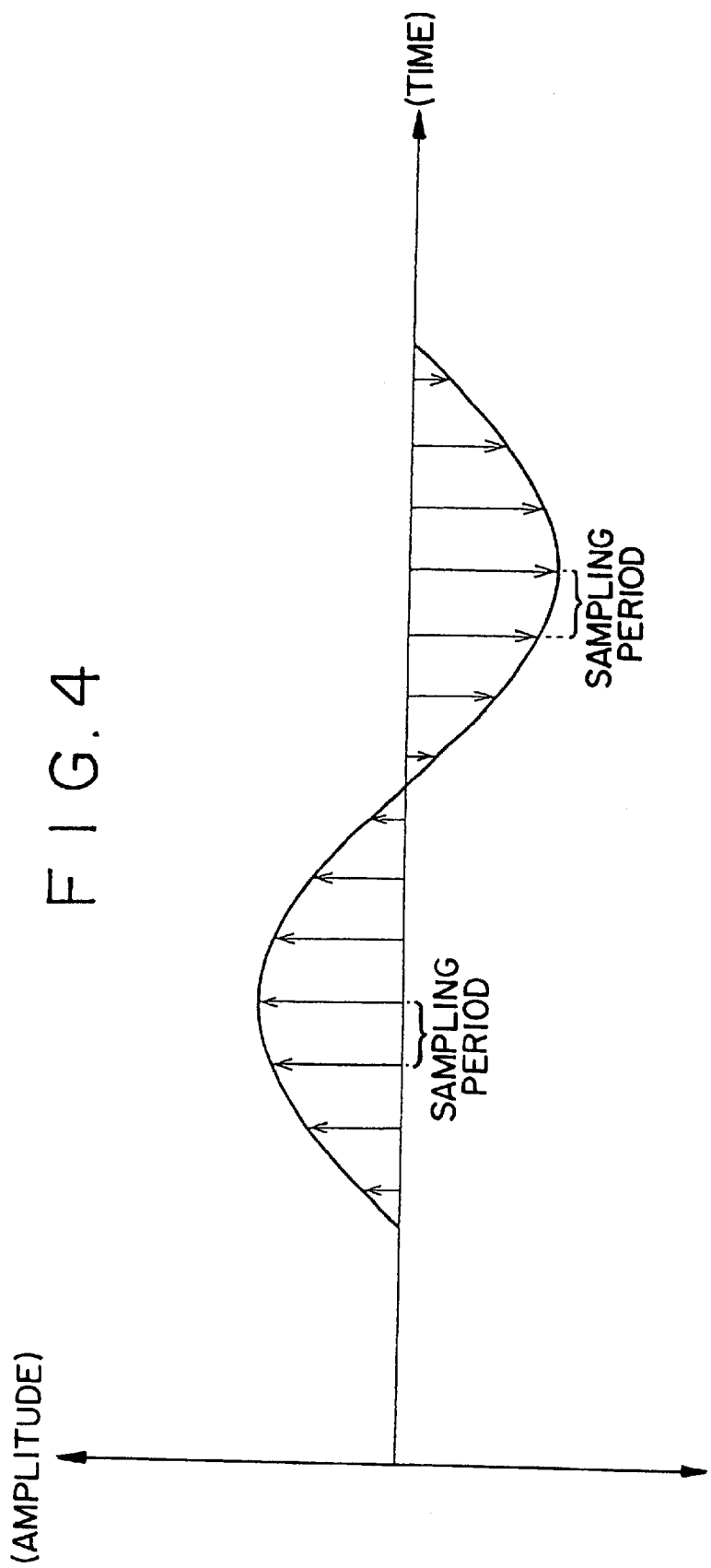

DETECTION CIRCUIT FOR MAXIMUM VALUE OF THREE PHASE SIGNAL AND DETECTION METHOD OF THE SAME

BACKGROUND OF THE INVENTION

The present invention relates to a detection circuit for a maximum amplitude value of a 3-phase signal in a position detector which converts a 3-phase signal to digital values and detects a position. In particular, it relates to a detection circuit for a maximum amplitude value of a 3-phase signal and a detection method of a maximum amplitude value of a 3-phase signal.

There is a position detector which inputs a 3-phase signal and converts it to digital values with an analog/digital converter (hereinafter referred to as an A/D converter), and detects a distance from an approximation straight line using these digital values.

A position detection method of a position detector will be explained in the following. FIG. 3 shows an illustrative drawing for explaining the waveforms of 3 phase-signals having 120° degrees difference in phase from each other. For example, a detection method for measuring a distance to a position in which 1 period of a signal emanating from that position is divided into 6 parts and the distance is detected in regarding the amplitude values as an approximation straight line will be explained. For example, assuming that 1 period (SIN θ) is 264 μm, 1 period divided by 6 gives 44 μm. In this case, the amplitude values can be approximated by a straight line 0 in FIG. 3. The distance from 0 to point "a" on the approximation straight line is 44 μm, and when the amplitude value (in this case, SIN(θ−120°)) obtained by A/D conversion is divided by the above-mentioned distance 44 μm, the amplitude value per 1 μm can be obtained.

In this detection method, an amplitude is converted to a distance, so that the detection of the maximum value of an amplitude is necessary. If the maximum value is not detected accurately, an error may occur in the measurement of the distance.

As a detection method of a maximum value of an amplitude, there is a method in which a sampling technique is utilized. FIG. 4 is an illustrative drawing showing the relation between the waveform of a signal and the sampling operation. The signal is sampled at a predetermined sampling period and the maximum value in the sampled values is taken as the maximum amplitude value.

However, there has been a problem in a conventional position detector that an accurate maximum amplitude value is difficult to obtain.

As mentioned above, in a detection method of a maximum value of an amplitude, where sampling is performed at a predetermined sampling period, the relation between the sampling period and the moving speed of a sensor becomes an important factor. As shown in FIG. 4, in a case where a sampling period is not properly chosen for the waveform of a signal, the maximum value is not always detected. For example, the mainstream of A/D converters in these days is the delta sigma type being comparatively low cost. However, with the delta-sigma type, the sampling period is rather long and the moving speed of a sensor has to be lowered to detect the maximum value accurately. In order to raise the moving speed of a sensor, a high speed A/D converter has to be used, which will cause a high manufacturing cost of the apparatus.

There has been a method in which at the time of shipment or when a sensor is exchanged for another, the maximum value is detected and memorized beforehand; however, actually, the maximum value is varied by various causes, such as the ON/OFF of a power supply at the time of measurement, fluctuation of a power supply voltage or aged deterioration. Therefore a detection circuit of a maximum amplitude value having an automatic corrector function has been awaited.

SUMMARY OF THE INVENTION

The present invention is provided considering the above-mentioned circumstances, and the object of the invention is to offer a detection circuit for a maximum amplitude value of a 3-phase signal and a detection method of a maximum amplitude value of a 3-phase signal.

In the present invention, in order to solve the above-mentioned problem, a detection circuit of a maximum amplitude value of a 3-phase signal composing a position detector converting the 3-phase signal into digital values and detecting a position is provided with: a comparison means for comparing the values of respective phase-signals in a 3-phase signal and a maximum amplitude decision means for deciding the value of one phase-signal as the maximum amplitude value, when the values of any two phase-signals among three phase-signals coincide with each other.

In the detection circuit of a maximum amplitude value of a 3-phase signal having the configuration as mentioned above, the values of respective phase-signals are compared by a comparison means, and it is detected whether the values of any two phase-signals among three phase-signals coincide with each other or not, and the result is output to the maximum amplitude value decision means. In a case where the values of any two phase-signals among three phase-signals coincide with each other, the value of the remaining 1 phase-signal is taken as the maximum amplitude value by the maximum amplitude decision means and it is memorized or output to the following process block.

In a detection method of a maximum amplitude value of a 3-phase signal composing a position detector for converting the 3-phase signal to digital values and detecting a position, the values of three phase-signals are compared with each other, and when the values of any two phase-signals coincide with each other, the value of the remaining 1 phase-signal is taken as the maximum amplitude value.

In the detection method of the maximum amplitude value of a 3-phase signal having such process procedures as mentioned above, the values of three phase-signals are compared with each other for detecting whether values of any 2 phase-signals coincide with each other or not. In the result, when any two phase-signals among three phase-signals coincide with each other, the value of the remaining one phase-signal is taken as the maximum amplitude value and it is memorized or output to the following process block.

BRIEF DESCRIPTION OF THE DRAWINGS

FIG. 4 shows the relation between the waveform of a signal and sampling.

DETAILED DESCRIPTION OF THE PREFERRED EMBODIMENTS

Figure 1:
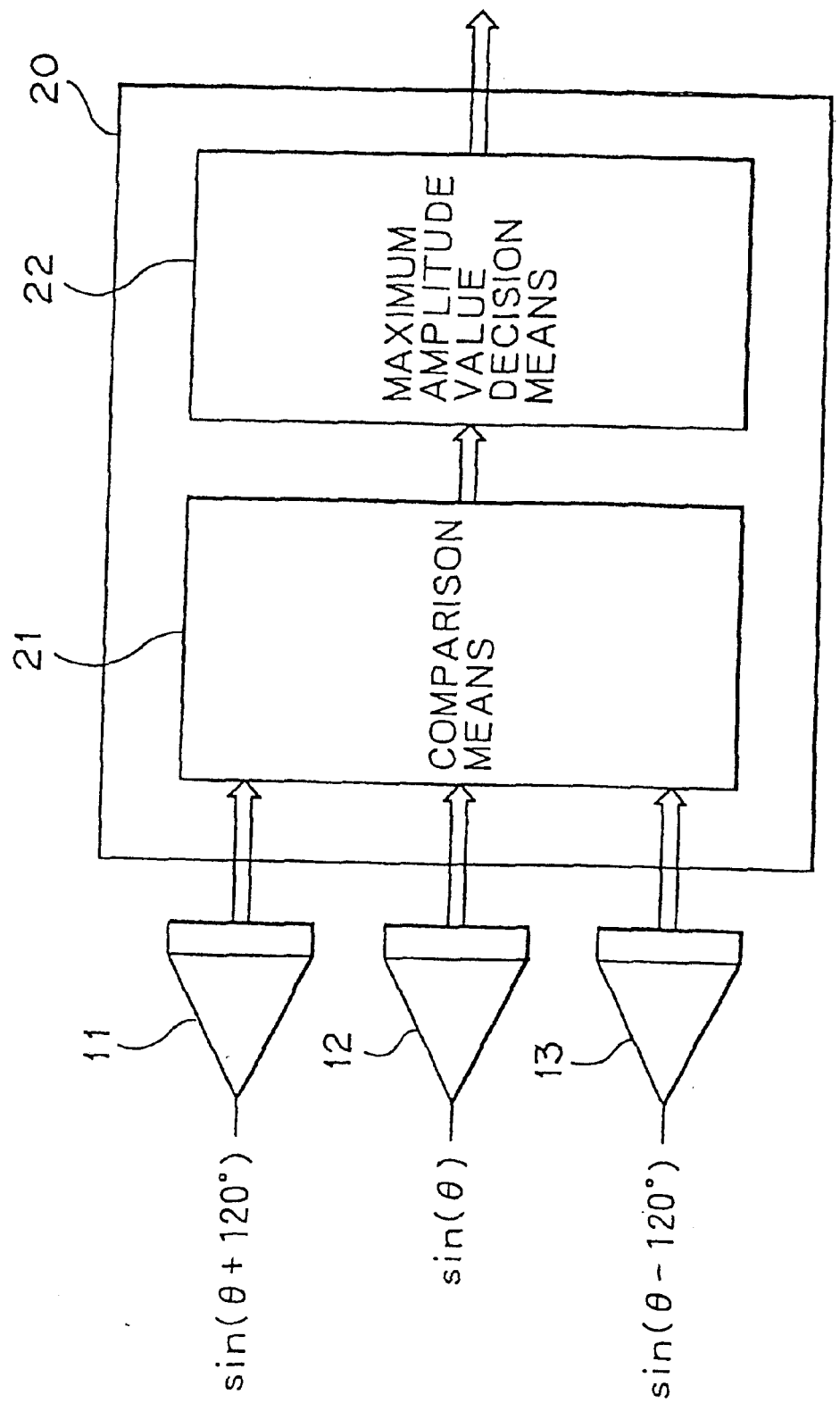
FIG. 1 shows a block diagram of a detection circuit of a maximum amplitude value of a 3-phase signal, being a form of an embodiment according to the present invention.

In the following an embodiment according to the present invention will be explained referring to the drawings.

Figure 3:
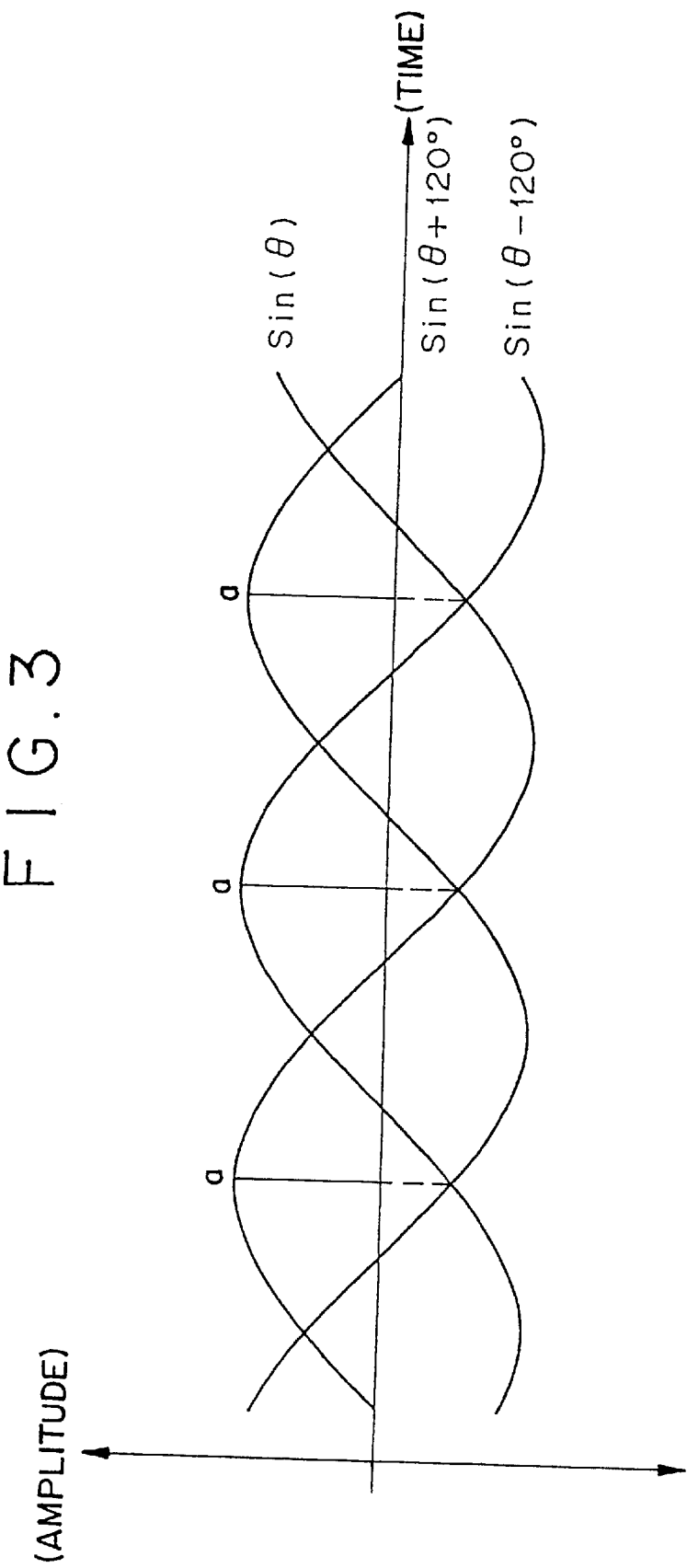
FIG. 3 shows a waveform of a 3-phase signal in which each phase-signal has a phase difference of 120°.

The principle of the present invention will be explained referring to FIG. 3. As explained above, FIG. 3 shows the waveform of three phase signals having a phase difference of 120°. For example, in a case where the point "a" is moved from right to left, from the maximum value as shown below, where of $SIN(\theta-120°)=1$, we then obtain $\theta=210°$. At this time, the values of the other two phase-signals are respectively obtained as shown below.

$$SIN(\theta)=SIN(210°)=-0.5$$

$$SIN(\theta+120°)=SIN(-30°)=-0.5$$

In other words, when $SIN(\theta)=SIN(\theta+120°)$, the absolute value of $SIN(\theta-120°)$ becomes always maximum.

The same thing can be applied to the cases of other combinations, that is, when the values of any two phase-signals among three phase signals coincide with each other, the value of the remaining one phase-signal can be the maximum amplitude value.

The detection circuit for a maximum amplitude value of a 3-phase signal and the detection method of a maximum amplitude value of a 3-phase signal, being the embodiments according to the present invention to which the above-mentioned principle is applied, will be explained.

FIG. 1 shows the block diagram of a detection circuit for a maximum amplitude of a 3-phase signal, being a first embodiment of the present invention. The detection circuit for a maximum amplitude value of a 3-phase signal, the embodiment according to the present invention, is composed of A/D converter circuits, 11, 12, 13, for sampling the 3-phase signal and performing A/D conversion, and an arithmetic circuit 20 for processing the A/D-converted signal values. The arithmetic circuit 20 is composed of a comparison means 21 for comparing the A/D-converted signal values and a maximum amplitude decision means 22 for deciding the maximum amplitude value according to the result obtained by the comparison means 21.

The A/D conversion circuit 11 inputs the digital values of a signal, $SIN(\theta+120°)$, at a predetermined sampling period and outputs them to the comparison means 21. In the same manner, the A/D conversion circuit 12 inputs the digital values of a signal, $SIN(\theta)$, at the predetermined sampling period and outputs them to the comparison circuit 21 and the A/D conversion circuit 13 inputs the digital values of a signal, $SIN(\theta-120°)$, at the predetermined sampling period and outputs them to the comparison circuit 21. The arithmetic circuit 20 is a process circuit having a function to detect the maximum amplitude value using the sampled signal values, and it is composed of a CPU and a memory (ROM, etc.) storing a processing program, and a memory for storing data for a time (RAM, etc.), and so forth. The comparison means 21 inputs digital values of the 3-phase signal by A/D converters, 11, 12, 13, and investigates them by comparison if the values of any two phase-signals in the input sampling data coincide with each other. In a case where the values of two phase-signals coincide with each other, the result is output to the maximum amplitude decision means 22. The maximum amplitude decision means 22, when the information of coincidence of two phase-signals is input, takes in the sampling value of the remaining 1 phase-signal from the comparison means 21 and takes it as the maximum value.

The operation of the detection circuit for a maximum amplitude value of a 3-phase signal and the detection method of a maximum amplitude value of a 3-phase signal having the configuration as mentioned above will be explained. Three phase-signals of a 3-phase signal having the phase difference of 120°, in every sampling period properly decided, is output to the comparison means 21 as digitized sampling data being A/D-converted by the A/D converters, 11, 12, 13. In the comparison means 21, the sampling data of the three phase-signals are investigated if the values of these two phase-signals coincide with each other. When the values of these two phase-signals coincide with each other, the maximum amplitude decision means 22 records the value of the remaining one phase-signal as the maximum amplitude value or outputs the value to the following process block. As mentioned above, it is made possible to detect the maximum amplitude value accurately by knowing the point of time when the two phase-signals among three phase-signals coincide, that is, the time when the value of the remaining one phase-signal becomes the maximum amplitude value. In comparison with the method in which the maximum value is detected in comparing two successive sampling data, in the present method, it is possible to perform processes with the data generated in every sampling period, so that there is no need to provide a memory to store data for comparison. Therefore, there is no need to add new parts for detecting the maximum amplitude value.

Figure 2:
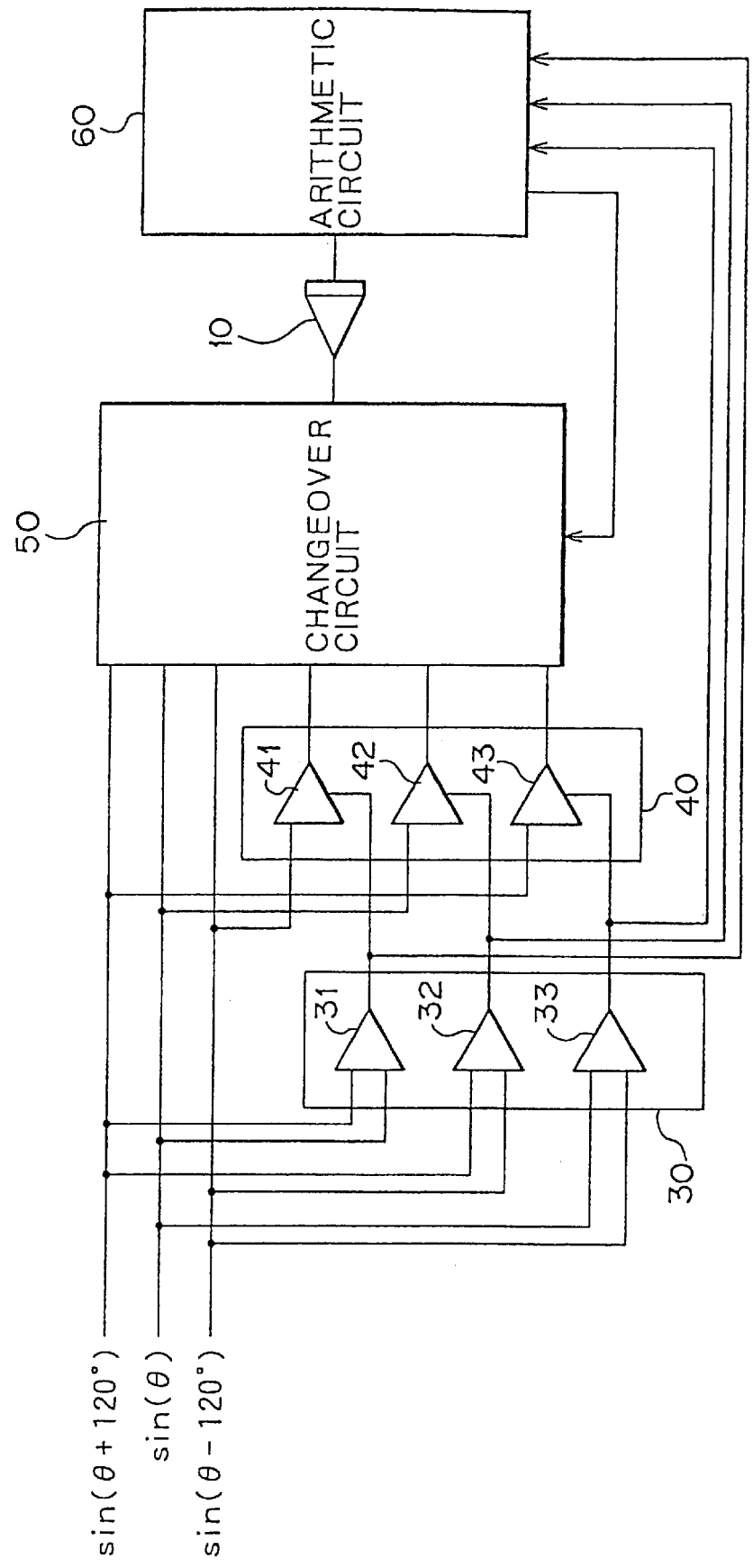
FIG. 2 shows a block diagram of a detection circuit of a maximum amplitude value of a 3-phase signal using a comparator, being a form of an embodiment according to the present invention.

Next, a detection circuit for a maximum amplitude value of a 3-phase signal using a comparator, a second embodiment of the present invention, will be explained. FIG. 2 shows the block diagram of a detection circuit for a maximum amplitude value of a 3-phase signal using a comparator, a form of an embodiment according to the present invention. The detection circuit for a maximum amplitude value of a 3-phase signal is composed of a comparator circuit 30 for comparing the values of two phase-signals among three phase-signals, a sampling data hold circuit 40 for holding the value of the remaining signal, a changeover circuit 50 for selecting the sampling data being held, an A/D conversion circuit 10 for A/D-converting the selected signal values by the changeover circuit 50 and an arithmetic circuit 60 for performing the control of the changeover circuit 50 and the process of the maximum amplitude value.

The comparator circuit 30 is a comparison means and it is composed of comparators, 31, 32, 33, to be able to correspond to every combination of two phase-signals selected from 3 phase-signals. The comparator 31 compares two phase-signal values, $SIN(\theta+120°)$ and $SIN(\theta)$. The comparator 32 compares two phase signal values, $SIN(\theta+120°)$ and $SIN(\theta-120°)$. The comparator 33 compares two phase-signals, $SIN(\theta)$ and $SIN(\theta-120°)$. The respective comparators 31, 32, 33, compare input two phase-signals, and when the values of any two phase-signals coincide with each other, the output signal is enabled. The outputs are connected to respective sampling data hold circuits, 41, 42, 43, corresponding to respective comparators, 31, 32, 33.

The sampling data hold circuit 40, being the maximum amplitude value decision means, is composed of sampling data hold circuits, 41, 42, 43, corresponding to comparator circuits, 31, 32, 33, respectively. The respective sampling data hold circuits, 41, 42, 43, are connected to the output circuits of the corresponding comparators as well as the remaining one phase-signal which is not connected to the corresponding comparator. For example, in the case of the sampling data hold circuit 41, it is connected to the output of the corresponding comparator 31 and a signal SIN(θ−120°) which is not connected to the comparator 31. In a similar manner, the sampling data hold circuit 42 is connected to the comparator 32 and a signal SIN(θ), and the sampling data hold circuit 43 is connected to the comparator 33 and a signal SIN(θ+120°). When an output signal of a comparator is enabled, the sampling data hold circuit holds the value.

The changeover circuit 50 selects a value held by the sampling data hold circuit 40, and outputs that value to the A/D converter circuit 10.

The A/D converter circuit 10 converts the signal value input from changeover circuit 50 into an A/D converted signal value and outputs that digital value and outputs the value to the arithmetic circuit 60.

The arithmetic circuit 60 inputs the data output by the A/D converter circuit 10 and performs a maximum amplitude value process or the position detection process, or inputs the signal from the comparator circuit 30 and performs the control process of the changeover circuit 50 corresponding to the input signal and so on.

The operation of the detection circuit for a maximum amplitude value of a 3-phase signal, and the detection method of a maximum amplitude value of a 3-phase signal, having the configuration as explained above will be explained. As an example, the operation of the comparator circuit 31 and the sampling data hold circuit 41 will be explained. The comparator circuit 31 inputs signals, SIN(θ+120°) and SIN(θ), and compares the values of these signals if they coincide with each other. When the values of signals, SIN(θ+120°) and SIN(θ), coincide with each other, the output signal of the comparator 31 is enabled. The value of the remaining one phase-signal SIN(θ−120°) is input to the sampling data hold circuit 41, and the value of the phase-signal SIN(θ−120°), when the output signal of the comparator 31 is reversed, that is, the maximum amplitude value is held and output. The output of the comparator 31 is also input to the arithmetic circuit 60, and following the instruction of the arithmetic circuit 60, the changeover circuit 50 selects the maximum amplitude value being held, and outputs it to the A/D converter circuit 10. The signal value is converted to digital values by the A/D converter circuit 10 and processed as the maximum amplitude value by the arithmetic circuit 60. The comparators, 32, 33, operate in the same manner and detect the maximum amplitude value.

As mentioned above, at the point of time when two phase-signals among three phase-signals coincide with each other, that is, at the point of time when the remaining one phase-signal becomes maximum, by holding the value of the remaining one signal, that is, the maximum amplitude value, the maximum amplitude value can be accurately detected. At the point of time when the values of the two phase-signals coincide with each other, the maximum amplitude value is detected, so that there is no need to memorize the previous maximum amplitude values. Further, the maximum amplitude value is held by sampling data hold circuits, 41, 42, 43, so that as an A/D converter circuit, a comparatively low priced delta-sigma type A/D converter circuit can be used. Further, in the present embodiment, the changeover circuit 50 is provided, so that only one unit of A/D converter circuit, which is expensive compared with the prices of other parts, will do.

In the above explanation, the comparator circuits and the corresponding sampling data hold circuits are provided to be able to correspond to every combination of selected two phase-signals out of three phase-signals; however, by providing the changeover means, it is also possible to perform the corresponding function to the above with only one unit of comparator and one unit of sampling data hold circuit. In that case, one unit of comparator circuit constitutes the comparator 30, and one unit of sampling data hold circuit constitutes the sampling data hold circuit 40, and a changeover circuit is provided which changes over input signals to the above-mentioned circuits in following the instruction from the arithmetic circuit 60. Since the arithmetic circuit 60 is also able to input the present value, by operating the changeover circuit to change over the input signals to the comparator circuit 30 and the sampling data hold circuit 40 in judging the direction of the movement of the 3-phase signal, it is made possible to perform the same operation as that of the detection circuit for the maximum amplitude value of the 3-phase signal mentioned above.

As explained above, it is detected if the values of any two phase-signals among three phase-signals coincide with each other by a comparison means, and when the values of any two phase-signals among the three phase signals coincide with each other, the maximum amplitude decision means takes the value of the remaining one phase-signal as the maximum amplitude value and outputs it or memorizes it. Therefore, at the point of time when the values of two phase-signals among three phase-signals coincide with each other, that is, at the point of time when the value of the remaining one phase-signal becomes the maximum amplitude value, the maximum amplitude value can be detected. Thus, it is made possible to detect the accurate maximum amplitude value.

In the detection method of the maximum amplitude value of a 3-phase signal according to the present invention, it is detected whether the values of any two phase-signal among three phase-signals coincide with each other or not, and in the case where the values of any two phase-signals coincide with each other, the value of the remaining one phase-signal is output or memorized as the maximum amplitude value. Thereby, the point of time when the values of any two phase-signals among three phase-signals coincide with each other, that is, the point of time when the value of the remaining one phase-signal becomes maximum can be accurately detected. In this manner, it is made possible to detect the accurate maximum value.

What is claimed is:

1. A detection circuit for generating a digital value corresponding to a 3-phase signal, comprising:

a comparison means for comparing the amplitude values of a first phase signal, a second phase signal, and a third phase signal of a 3-phase signal; and a maximum amplitude decision means operatively coupled to the comparison means for determining a maximum amplitude value of the first phase signal when the values of the second and third phase signals coincide with each other.

2. The detection circuit of claim 1, further comprising:

an analog/digital converter circuit for converting the values of said 3-phase signal into three separate digital values and outputting said digital values to said comparison means, wherein said comparison means then compares the digital values of said three-phase signals.

3. The detection circuit of claim 2, further comprising:

an arithmetic circuit for detecting said maximum amplitude from said digital signal values, the circuit comprising a CPU, a ROM holding a processing program, and a RAM for storing data.

4. A detection circuit of a maximum amplitude value of a 3-phase signal as designated in claim 1, wherein said comparison means further comprises a combination of comparator circuits for comparing the values of any two phase-signals among said three phase-signals, and detecting when those two phase signals coincide with each other, and wherein said maximum amplitude decision means further comprises a sampling data hold circuit for holding the value of the remaining one phase signal when an output of said comparator is enabled.

5. The detection circuit of claim 4, further comprising:

an analog/digital converter connected to said sampling data hold circuit, for converting the data held therein from analog to digital.

6. The detection circuit of claim 5, further comprising:

said analog/digital converter is a delta-sigma type.

7. A detecting method of a maximum amplitude value of a 3-phase signal comprising the steps of:

comparing the values of three separate phase-signals by comparing the first with the second, the first with the third, and the second with the third, determining when the values of any two phase-signals among said three-phase signals coincide with each other, and selecting the amplitude value of the remaining phase-signal as the maximum amplitude value.

8. The detecting method of claim 5, further comprising:

before said comparing step, converting all three signals from analog to digital.

9. The detecting method of claim 8, wherein the comparing, determining and selecting steps are conducted every sampling period.

* * * * *